United States Patent [19]

Scarselletta

[11] 4,428,359
[45] Jan. 31, 1984

[54] DETACHABLE INSERT FOR SOLAR ABSORBER

[75] Inventor: Louis Scarselletta, Lockport, N.Y.

[73] Assignee: General Motors Corporation, Detroit, Mich.

[21] Appl. No.: 345,930

[22] Filed: Feb. 4, 1982

[51] Int. Cl.³ .................... F24J 3/02; D03C 13/00; F16F 1/34
[52] U.S. Cl. ..................................... 126/418; 138/89; 165/71
[58] Field of Search .................... 220/307, DIG. 19; 165/71; 138/89, 90, 91; 126/450, 418, 420, 417; 285/13, 397, 370

[56] References Cited

U.S. PATENT DOCUMENTS 4,310,182  1/1982  Vandenbossche .................... 138/89
4,353,356 10/1982  Vandenbossche .................. 126/418

Primary Examiner—Samuel Scott
Assistant Examiner—G. Anderson
Attorney, Agent, or Firm—R. L. Phillips

[57] ABSTRACT

A detachable insert for solar absorbers with flow-through headers is disclosed which adapts such headers to vertical as well as horizontal mounting without fluid stagnation and with full drainability. The insert is insertable in the lowermost unused header leg of one of the headers when the headers are vertically oriented and sealingly plugs off the length thereof below the lowermost one of the longitudinal passages which interconnect the headers.

1 Claim, 5 Drawing Figures

DETACHABLE INSERT FOR SOLAR ABSORBER

This invention relates to solar absorbers and more particularly to a detachable insert for solar absorbers with flow-through headers adapting the latter to vertical as well as horizontal mounting without fluid stagnation and with full drainability.

Solar absorbers of the type having a pair of flow-through manifolds or headers interconnected by a plurality of separate and parallel longitudinal passages are commonly mounted with the longitudinal passages extending either horizontally (horizontal position or array) or vertically (vertical position or array). In this type solar absorber, it is common practice to provide the headers with a leg at each end having an open through passage which is adaptable at installation for use as either an inlet or outlet connection for the header or else is capped or plugged. For example, at installation, one of each header is selected for use as an inlet or outlet and the remaining leg of each header is either capped or plugged to thereby provide the solar absorber with single pass flow with the fluid entering one header, then the longitudinal tube passages and finally exiting the other header. In the case of a vertical mounted array, the closed leg in the lower horizontally oriented header is normally drainable along with the longitudinal passages and the upper header which is also horizontally oriented. However, there is a so-called "Dead Leg" problem that commonly results in the case of a horizontally mounted array with this type solar absorber when the lower leg of one of the then vertically arranged headers is closed by capping or plugging. This "Dead Leg" problem occurs where such closed lower leg in the one vertical header extends below the bottommost longitudinal passage resulting in its filling with the cooling fluid which then becomes stagnant therein. During freezing conditions, the stagnant cooling fluid which is neither drainable nor capable of being reheated by circulation can then freeze and cause header damage. As a result, the solar industry has had to restrict the use of such absorbers with flow-through headers to vertically oriented longitudinal passage arrays and provide a special non-stagnating drainable absorber header design or else provide special costly drain fittings for horizontal mounting with the conventional design. Thus far, there has been no practical low-cost solution to the "Dead Leg" problem in a solar absorber with such flow-through headers resulting in a single or universal absorber design which is readily adaptable at installation to either type mounting.

The present invention solves this "Dead Leg" problem with a low-cost detachable insert means which readily adapts the absorber at installation to either type mounting, i.e. horizontal or vertical. In the case of the vertically mounted array, there is no "Dead Leg" problem as previously indicated with the normal flow-through header. According to the present invention, the normal flow-through header absorber design is retained without modification and is rendered adaptable for horizontal installation as well by the detachable insert means. The insert means in the case of horizontal mounting is insertable at the time of installation in the one unused lowermost leg in one of the then vertically oriented flow-through headers and includes seal means mounted thereon which operates to seal off the "Dead Leg" just below the lowermost horizontal longitudinal passage to effectively prevent fluid stagnation and freezing therein. In the preferred embodiment, the detachable insert means is inexpensively made as a simple injection molded part which forms a plug body and the sealing means is provided by an O-ring which is retained about the inner or plug end of the plug body. The plug body has a stop which engages the end of the header's unused leg and an effective insertion length measured from the stop corresponding to the length of the "Dead Leg" so that the latter is sealed off just below the lowermost horizontal longitudinal passage. The plug body is adapted to be retained in place in the field at the time of installation by then simply cross-drilling a hole through the leg and plug body and inserting a conventional retainer such as a cotter pin.

These and other objects, advantages and features of the present invention will become more apparent from the following description and drawing in which.

Figure 1:
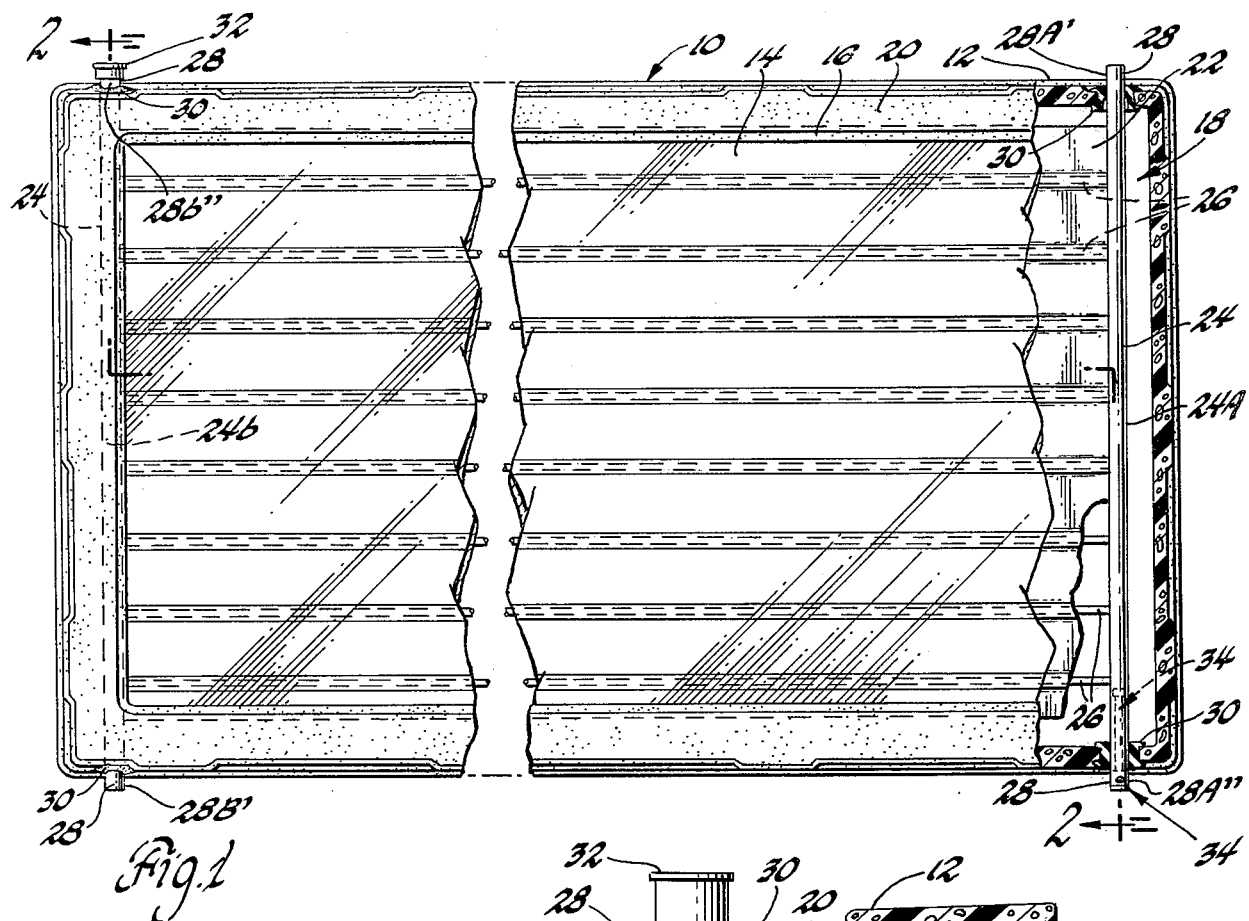
FIG. 1 is a front or solar side view with parts broken away of a solar panel including a solar absorber in which is inserted the preferred embodiment of the detachable insert means according to the present invention.
Figure 2:
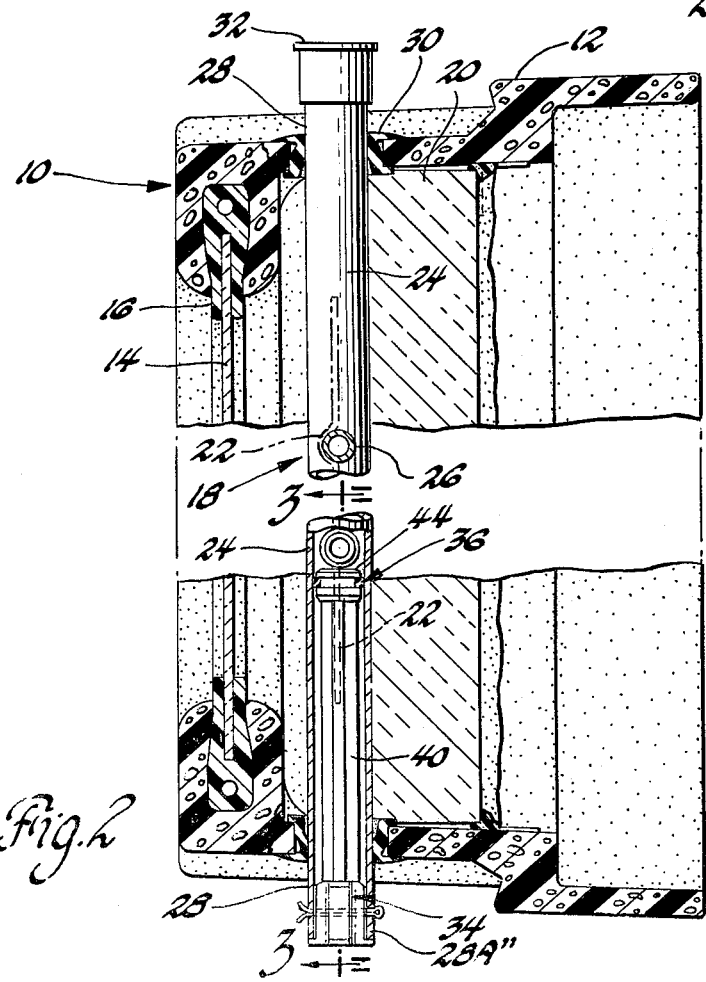
FIG. 2 is an enlarged cross-sectional view taken along the line 2—2 in FIG. 1.

Referring to FIGS. 1 and 2, there is shown a solar panel 10 comprising a perimeter frame 12 of molded polyurethane in which a glass panel 14 and a perimeter seal 16 of elastomeric material is sealingly secured in place on the front or solar side thereof during the molding of the frame as disclosed in detail in U.S. Pat. No. 4,249,517 assigned to the assignee of this invention and which is hereby incorporated by reference. An absorber assembly 18 is mounted in the frame 12 behind the glass panel 14 on a rigid insulation panel 20 of glass reinforced polyisocyanurate. The insulation panel 20 is mounted in the backside of the frame 12 and is secured and sealed along an inner perimeter thereof to complete the sealing enclosure of the absorber assembly 18.

The absorber assembly 18 is made of material having high thermal conductivity such as copper and the like and is plated with black chrome. The absorber assembly comprises an absorber plate 22 and a pair of flow-through headers 24 interconnected by a plurality of separate and parallel longitudinal passages 26 which are all bonded such as by soldering to the backside of the absorber plate 22. Both the flow-through headers 24 and the longitudinal passages 26 which interconnect the headers comprise the fluid circuitry of the absorber and are formed with straight hollow cylindrical tubes or pipes as shown.

As shown in FIGS. 1, 2, 3 and 5, the tubular flow-through headers 24 have their opposite ends 28 which are commonly called legs extending through openings in opposite sides of the solar panel frame 12. A ring-shaped seal 30 of elastomeric material seals each of the header legs 28 in the frame 12 and the legs are normally left open at the time of manufacture of the solar panel. The open header legs 28 may then be used as either an inlet or outlet connection or else plugged or capped if unused at the time of installation of the solar system, i.e. on site, depending upon the routing of the plumbing thereto and the orientation of the solar panel, i.e. horizontal or vertical. For example, the solar panel 10 may be mounted with the longitudinal passages 26 in a horizontal array as shown in FIG. 1 or the solar panel may be mounted with the longitudinal passages in a vertical array which is 90° from the position shown in FIG. 1. It will also be understood that in both the horizontal and vertically mounted positions of the longitudinal passages, the solar panel and thus the absorber assembly is also typically mounted at an angle to the earth's surface and relative to the sun's rays at that earth location so as to best absorb the solar energy available through the year.

When the solar panel is mounted with the longitudinal passages 26 in vertical array, the flow-through headers 24 are then horizontally oriented. Assuming in such case that the header 24A is the lowermost header and 24B is the uppermost header, the one leg 28A' of the lowermost header 24A could then be used as the inlet connection to the solar panel and the opposite leg 28B' of the then uppermost header 24B could be used as the outlet connection from the solar panel while the other leg 28A" and 28B" of the respective headers would then be capped or plugged. With such a vertically mounted array, the lowermost header 24A is below the interconnecting longitudinal passages 26 and there is no resultant "Dead Leg" to capture and retain the cooling fluid, the absorber circuitry 24, 26 being readily drainable through the plumbing connection with the lowermost header 24A. However, when such a solar panel is mounted with the longitudinal passages 26 in horizontal array as shown in FIG. 1, it can be seen that there does result a "Dead Leg" problem in one of the headers 24. For example, with the solar panel so mounted and when the header leg 28B' of header 24B is used as the inlet connection and the leg 28A' of the other header 24A is used as the outlet connection, the other leg 24B" of header 24B would be closed such as by the cap 32 as shown and the lowermost leg 28A" of header 24A must also be closed. If the header leg 28A" was closed at its end with a simple cap like cap 32, it would fill with the cooling liquid and become stagnant because it extends below the lowermost longitudinal passage 26 as can be seen in FIG. 1. During freezing conditions, the resulting stagnant liquid in leg 28A" which is neither drainable nor capable of being heated by circulation could then freeze and cause absorber header damage.

Figure 3:
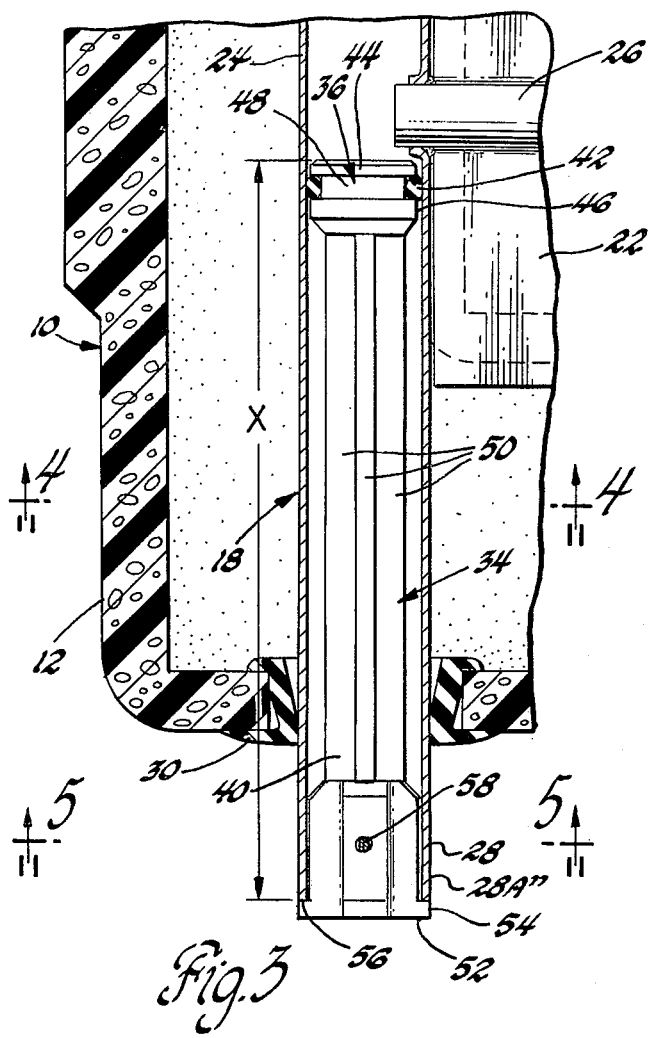
FIG. 3 is an enlarged cross-sectional view taken along the line 3—3 in FIG. 2.
Figure 4:
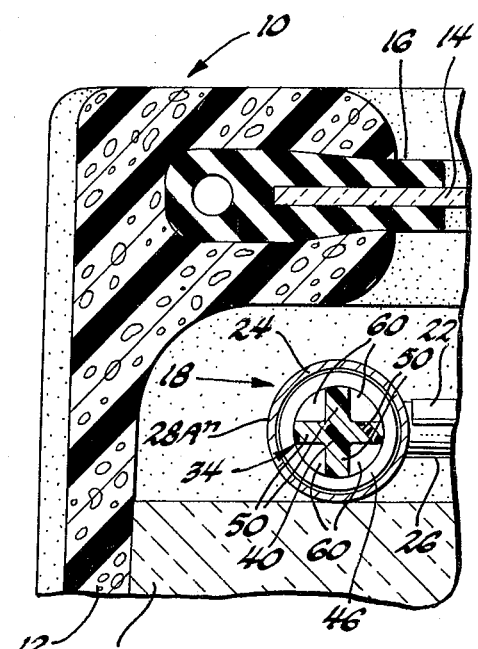
FIG. 4 is a cross-sectional view taken along the line 4—4 in FIG. 3.
Figure 5:
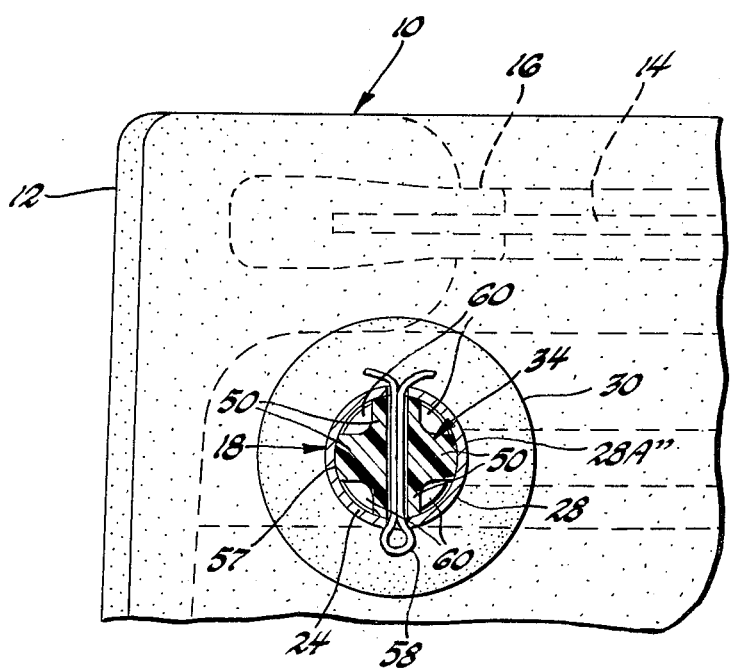
FIG. 5 is a cross-sectional view taken along the line 5—5 in FIG. 3.

According to the present invention, there is provided simple low-cost detachable insert means 34 which readily adapts the absorber at installation to use in the horizontal position as well as the vertical position without any attendant "Dead Leg" problem. In the case of the vertically mounted array, there is no "Dead Leg" problem as previously indicated with these normal flow-through headers and simple capping or plugging of the unused header legs would then be employed. According to the present invention, the normal flow-through header absorber design is retained and made suitably adaptable for horizontal installation as well as by the detachable insert means 34. The insert means 34 is insertable in the lowermost unconnected or unused leg in the one then vertically oriented header when the solar panel is so mounted and includes sealing means 36 which operates to seal off the length of this "Dead Leg" passage to effectively prevent fluid stagnation and freezing therein. For example, when the solar panel is so mounted as shown in FIG. 1, the detachable insert means 34 will be inserted at the time of installation in the lowermost leg 28A" of the vertically oriented header 24A. In the preferred embodiment shown, the detachable insert means is inexpensively made as an injection-molded part forming a plug body 40 and the sealing means is provided by an O-ring 42 which is retained about the inner or plug end 44 of the plug body (see FIGS. 2 and 3). The material for both the plug body 40 and O-ring 42 are chosen for their compatibility with various cooling fluids such as water, glycol solution, etc. with high temperatures of stagnation and with freezing conditions. The plug end 44 of the plug body 40 is formed with a cylindrical portion 46 which is closely slidably receivable in the header leg and has an annular groove 48 which receives and retains the O-ring 42. The plug body 40 is further provided with four equally angularly spaced radially extending ribs 50 which extend longitudinally from the cylindrical portion end 46 to the outboard end 52 (see FIGS. 2–5). The ribs 50 at the outboard end 52 extend radially outboard at 54 so as to engage the end 56 of the header leg and have an adjacent inboard intermediate diameter at 57 which together with the plug end portion 46 centrally locates the plug in the header leg. The plug body 40 has an effective insertion length X as shown in FIG. 3 measured from its stop portion 54 to its insertion end 44 which is made to correspond to that of the "Dead Leg" so that the latter is sealed off by the plug end portion 46 and O-ring 42 just below the lowermost horizontal longitudinal passage 26 as shown in FIGS. 1–3. Moreover, the spaces 60 between the ribs 50 provides fluid weepage passages to assure positive leak detection through the end of the leg without the potential for header damage. The plug body 40 is retained in place at the time of installation by then simply cross-drilling a hole through the header leg 28A" and plug body and inserting a conventional retainer such as a cotter pin 58 as shown.

The present invention thus allows the solar panel manufacturer to retain the advantages of flow-through headers and to eliminate the cost associated with a separate model or special fittings for horizontal mounted arrays by tailoring the absorber on site to fit a specific application.

The above-described preferred embodiment is illustrative of the present invention which may be modified within the scope of the appended claims.

The embodiments of the invention in which an exclusive property or privilege is claimed are defined as follows:

1. An insert device adapted for use with a solar absorber having longitudinal passages interconnecting a pair of flow-through headers when the solar absorber is mounted with the headers vertical and the longitudinal passages horizontal and one of the headers has an unused leg at its lower end that extends a substantial distance below the lowermost longitudinal passage, said insert device adapted for insertion in the unused leg and comprising a plug body having an inner end portion adapted to form a plug in the unused leg and an outer end adapted to engage and stop the plug body against the end of the unused leg, seal means mounted on and extending about said inner plug end portion for providing sealing between the latter and the interior of the unused leg and an elongated middle portion interconnecting said inner end portion and said outer end, said plug body having a length measured from said inner plug end portion along said middle portion to said stop corresponding to the length of the unused leg measured from its end to the lowermost horizontal longitudinal passage so that said inner plug end portion and seal means are located to plug off and seal the unused leg just below the lowermost horizontal longitudinal passage whereby fluid stagnation is prevented from occurring in the unused leg, said plug body further including weepage passage means extending from said inner plug end portion and along said middle portion and past said outer end for providing detection of leakage past said seal means, and securing means for securing said plug body in its stopped location in the unused leg.

* * * * *